Sept. 29, 1964  G. E. DREESEN ETAL  3,150,650
VARIABLE AREA DIFFUSER FOR COMPRESSOR
Filed Sept. 29, 1961  2 Sheets-Sheet 1

INVENTORS
Glen E. Dreesen
BY Lawton P. Evans

Fryer and Ginsvold
ATTORNEYS

United States Patent Office 3,150,650
Patented Sept. 29, 1964

3,150,650
VARIABLE AREA DIFFUSER FOR COMPRESSOR
Glen E. Dreesen, Wyoming, Ill., and Lawton P. Evans,
Seattle, Wash., assignors to Caterpillar Tractor Co.,
Peoria, Ill., a corporation of California
Filed Sept. 29, 1961, Ser. No. 141,894
7 Claims. (Cl. 123—119)

The present invention relates to turbochargers and more particularly to means for controlling the turbocharger output to correspond with engine demands.

Turbochargers used to supply air for forming a combustible mixture to be used in an internal combustion engine have an undesirable performance characteristic known as surging which occurs at low speed engine operation. Surging, which is a rapid fluctuation of the static pressure in the compressor, is caused by a low rate of air consumption accompanying low engine speeds. When the pressure in the compressor increases due to the engine not consuming all the air that is furnished by the compressor, pressure in the compressor housing exceeds the total air pressure in the diffuser and a reversal in the direction of air flow occurs. This results in a pressure drop in the compressor housing which is quickly built back up by normal compressor action until the pressure build up is sufficient to reverse the air flow again. This sequence of events causes air to be delivered to the engine in surges which results in inefficient engine operation.

It is an object of this invention to provide a turbocharger which does not experience surging at low engine speeds.

It is another object of this invention to provide means by which the area of a diffuser in the compressor stage of a turbocharger is varied to control air flow in a manner consistent with the needs of an engine.

It is another object of the present invention to provide a turbocharger for augmenting the air supply to an internal combustion engine wherein the turbocharger operates effectively over a wide range of engine speeds and is therefore adaptable for use with a wide variety of engines.

Further and more specific objects and advantages of the invention are made apparent in the following specification wherein a preferred form of the invention is described by reference to the accompanying drawing.

Figure 1:
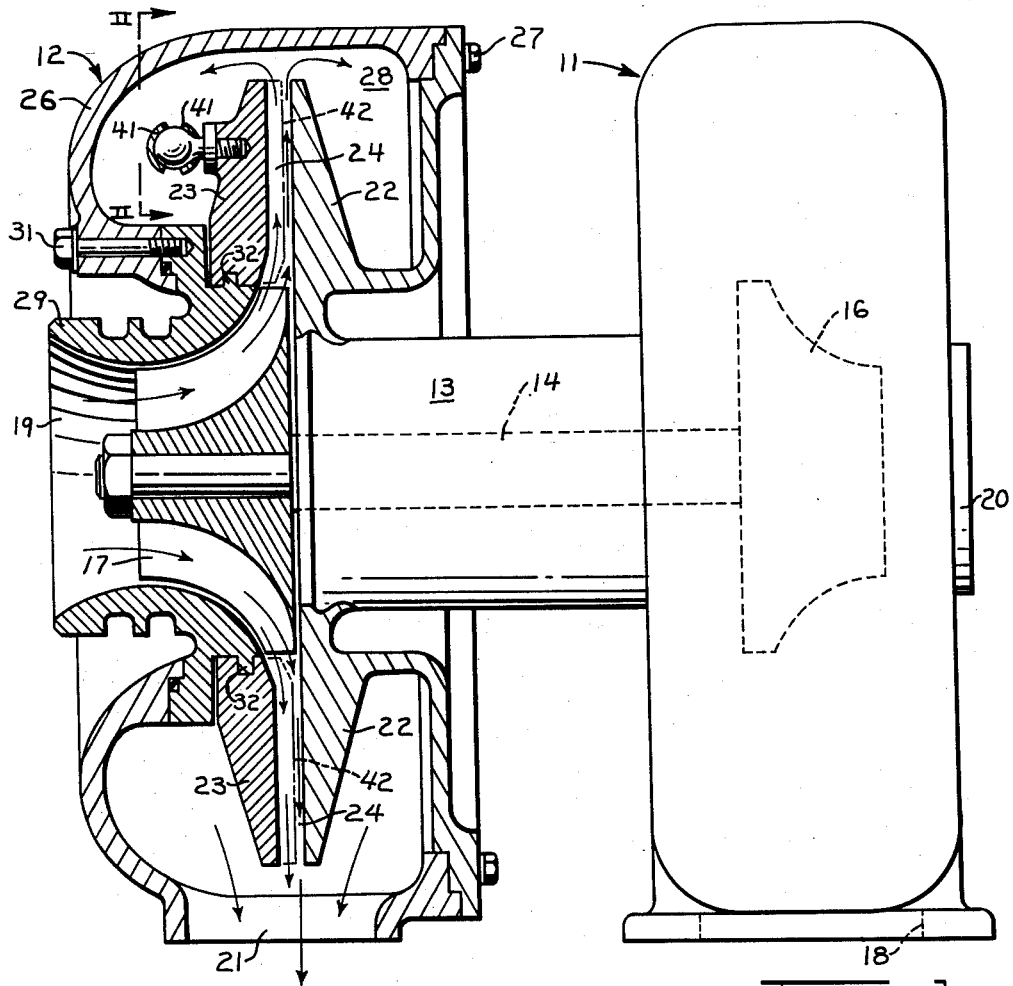
FIG. 1 is a side elevation of a turbocharger wherein the compressor stage is shown in section while the turbine stage is indicated only to show its relation to the compressor stage.

The turbocharger shown in FIG. 1 of the drawing comprises a turbine unit generally indicated at 11 and a compressor unit generally indicated at 12, connected as by an integral bearing housing 13 in which a shaft 14 is rotatably supported. The shaft 14 serves as a common support for a turbine wheel shown in dotted lines at 16 and a compressor wheel 17.

The turbocharger functions in a conventional manner, the turbine wheel 16 being rotated by the exhaust gas of an internal combustion engine 15 (FIG. 3) entering through an inlet 18, impinging on the blades of the turbine wheel and imparting high speed rotation thereto. The exhaust gases then flow outwardly through an exhaust fitting indicated at 20. The rotation of the turbine wheel 16 is imparted through the shaft 14 to the compressor wheel 17, the function of which is to draw atmospheric air through an inlet 19 and dispel it radially outwardly through a discharge opening at the point 21 from which it is directed by a conduit to the intake manifold of internal combustion engine 15.

A fixed diffuser ring 22 and an adjustable diffuser ring 23 combine to form a diffuser passage 24 through which the air drawn in by compressor wheel 17 flows. Diffuser ring 22 is rigidly affixed to compressor housing 26 as by cap screws 27 and forms an internal chamber 28 therewith. An inlet portion 29 secured to housing 26 as by cap screws 31 defines inlet 19 and provides an adjustable support for ring 23. The inner part of portion 29 serves as a support for the adjustable diffuser ring 23. A thread 32 formed on this inner part as a plurality of helical segments unites with adjustable ring 23 in a manner which allows rotation thereof. The helical segments 32 advance ring 23 toward ring 22 when the adjustable ring is rotated in one direction and withdraw member 23 from member 22 when the adjustable ring is rotated in the other direction. Thus, rotation of ring 23 results in the diffuser passage 24 being varied in size.

An engine operating at normal speed will utilize sufficient quantities of air for combustion to prevent excessive pressure build up in chamber 28. When, however, the speed of the engine is reduced, as when working under heavy load, but the speed at which compressor wheel 17 is operated is not proportionally reduced, more air will be delivered to channel 28 through diffuser area 24 that is useable by the engine. The result is an excess of pressure build up in channel 28 until such a time as the pressure is sufficient to overcome the incoming air through inlet 19 at which time a reversal in air flow occurs causing a pressure drop in channel 28, which results in surging.

Figure 2:
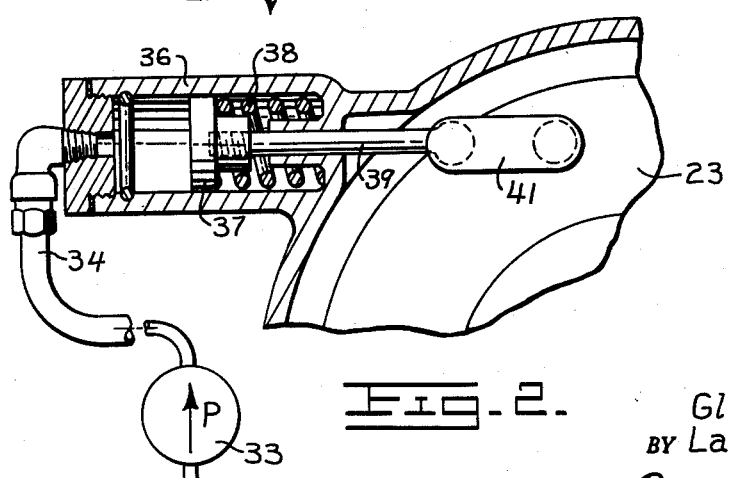
FIG. 2 is a fragmentary sectional view taken on the line II—II of FIG. 1 to more clearly show the means by which the diffuser area is varied.
Figure 3:
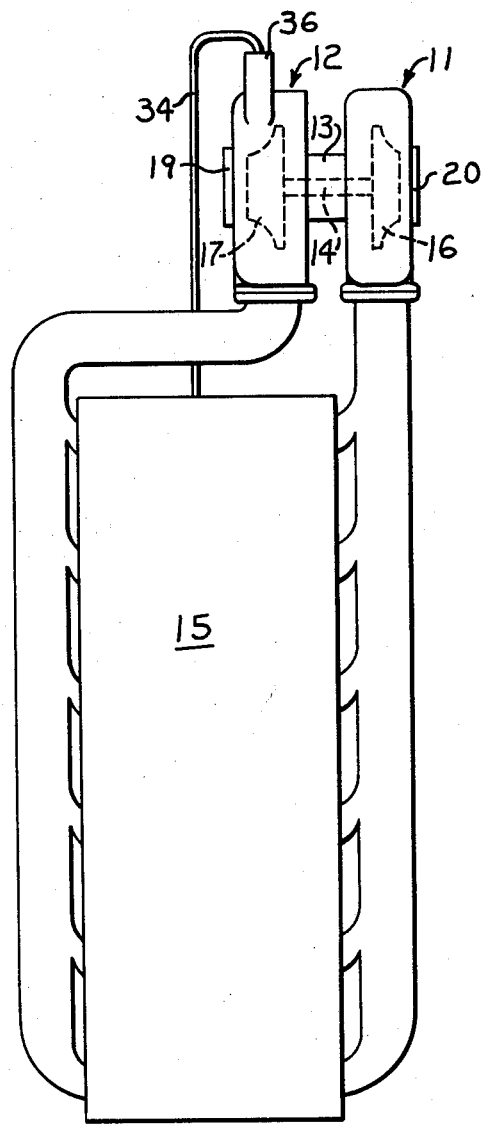
FIG. 3 is a semi-schematic illustration showing the operative relationship between the turbocharger of FIG. 1 and the engine to which it is connected.

Referring now to FIGS. 2 and 3 a pump 33 driven by the engine 15, such as an engine fuel pump or oil pump, supplies hydraulic fluid through a line 34 to a cylinder 36. The hydraulic fluid entering cylinder 36 exerts pressure against one face of a piston 37 against the bias of a spring 38. A piston rod 39 connects piston 37 to a link 41 articulately secured on diffuser ring 23 as by a ball joint as shown. Since pump 33 is engine driven, the hydraulic force experienced by piston 37 will be proportional to the engine speed. Reduced engine speed will lower the hydraulic pressure on piston 37 allowing spring 38 to urge the piston to the left. Leftward motion of piston 37, as shown in FIG. 2, results in counter-clockwise rotation of diffuser ring 23 which results in ring 23 advancing toward fixed ring 22.

Referring to FIG. 1 broken line 42 indicates the position assumed by ring 23 at low engine speed. The size of diffuser passage 24 is seen to be at a minimum when engine speed is low and at a maximum when engine speed is high and essentially proportional therebetween. When diffuser passage 24 is reduced at low engine speed, the velocity of air traveling through the passage will be increased to support the pressure in chamber 28 while the volume of air flowing therethrough will be decreased. The engine is then able to operate at low speeds without the undesirable characteristic of surging.

The ability of the compressor of the present invention to deliver air to an engine in quantities commensurate with the requirements of the engine allows one turbocharger to be useable with a wide range of engine sizes and types. This obviates the necessity of providing turbochargers of different sizes and capacities for engines of different ratings.

What is claimed is:

1. In a turbocompressor having a compressor wheel co-axially disposed within structure forming an air inlet the combination comprising a stationary diffuser disc, an adjustable diffuser disc defining a diffuser passage with said stationary disc through which air drawn by said compressor wheel passes, and means operable to axially position said adjustable disc.

2. In a turbocompressor having a compressor wheel co-axially disposed within structure forming an air inlet wherein the inlet structure is supported by the compressor housing the combination comprising a stationary diffuser disc supported by the housing and disposed co-axial with the compressor wheel, an adjustable diffuser disc in spaced facing relation with said stationary disc and defining a diffuser passage therewith through which air drawn in to said housing by said compressor wheel passes, and support means for said adjustable disc providing axial movement of said disc in response to angular adjustment thereof.

3. In a turbocompressor having a compressor wheel co-axially disposed within structure forming an air inlet wherein the inlet structure is supported by the compressor housing the combination comprising a stationary diffuser disc supported by the housing and disposed co-axial with the compressor wheel, and an adjustable diffuser disc supported in spaced facing relation to said fixed disc and defining a diffuser passage therewith through which air drawn in to said housing by the compressor wheel passes, said adjustable disc having a threaded connection with its support member to advance axially toward said fixed disc when rotated in one direction and withdraw axially from said fixed disc when rotated in the other direction.

4. The turbocompressor of claim 1 further comprising structure forming an air outlet, an internal combustion engine disposed to receive air from the outlet, and means responsive to a decrease in engine speed to axially adjust said adjustable disc toward said stationary diffuser disc.

5. The turbocompressor of claim 2 further comprising structure forming an air outlet, an internal combustion engine disposed to receive air from the outlet, and means responsive to a change in engine speed to angularly adjust said adjustable disc to impart axial movement thereto whereby said adjustable disc moves toward said stationary disc when engine speed decreases and away from said stationary disc when engine speed increases.

6. The turbocompressor of claim 3 further comprising structure forming an air outlet, an internal combustion engine disposed to receive air from the outlet, and means responsive to engine speed to rotate said adjustable disc to advance when engine speed decreases and withdraw when engine speed increases.

7. The combination of claim 6 in which said last named means comprises a cylinder with a spring biased piston, means connecting said piston with said adjustable disc, an engine driven pump and means for directing fluid under pressure from said pump to said cylinder.

References Cited in the file of this patent
UNITED STATES PATENTS

| | | |
|---|---|---|
| 1,085,045 | Holzapfel | Jan. 20, 1914 |
| 2,113,979 | Bokemuller | Apr. 12, 1938 |
| 2,242,374 | Schultz et al. | May 20, 1941 |
| 2,405,282 | Birmann | Aug. 6, 1946 |
| 2,423,417 | Stokes et al. | July 1, 1947 |
| 2,500,234 | Bates | Mar. 14, 1950 |
| 2,540,916 | Sparrow | Feb. 6, 1951 |
| 2,678,642 | Alexanderson et al. | May 18, 1954 |
| 2,739,782 | White | Mar. 27, 1956 |
| 2,933,237 | Darrow et al. | Apr. 19, 1960 |
| 2,980,394 | Rowlett et al. | Apr. 18, 1961 |
| 2,996,996 | Jassniker | Aug. 22, 1961 |